United States Patent [19]

Tyree, Jr.

[11] Patent Number: 4,695,302

[45] Date of Patent: Sep. 22, 1987

[54] PRODUCTION OF LARGE QUANTITIES OF $CO_2$ SNOW

[75] Inventor: Lewis Tyree, Jr., North Oak Brook, Ill.

[73] Assignee: Liquid Carbonic Corporation, Chicago, Ill.

[21] Appl. No.: 923,908

[22] Filed: Oct. 28, 1986

[51] Int. Cl.$^4$ ................................................ F25J 1/00
[52] U.S. Cl. ........................................ 62/10; 62/46; 62/384
[58] Field of Search ................... 62/10, 46, 47, 384

[56] References Cited

U.S. PATENT DOCUMENTS

| | | | |
|---|---|---|---|
| 2,496,185 | 1/1950 | Voss et al. | 62/46 |
| 3,660,985 | 5/1972 | Tyree, Jr. | 62/10 |
| 3,754,407 | 8/1973 | Tyree, Jr. | 62/55 |
| 3,810,365 | 5/1974 | Hampton et al. | 62/48 |
| 3,933,001 | 1/1976 | Muska | 62/10 |
| 4,211,085 | 7/1980 | Tyree, Jr. | 62/48 |

Primary Examiner—Ronald C. Capossela
Attorney, Agent, or Firm—Fitch, Even, Tabin & Flannery

[57] ABSTRACT

Large quantities of $CO_2$ snow are provided by a system and method which utilizes two reservoirs which maintain at least about 4500 pounds of $CO_2$ at about its triple point, a substantial portion of which contains solid $CO_2$. A first such reservoir subcools high pressure liquid $CO_2$ flowing therethrough and permits efficient production of $CO_2$ snow. A second such reservoir assists in cooling and condensing $CO_2$ vapor recirculating through the system, as well as in efficiently obtaining $CO_2$ being delivered to the system from an outside source.

18 Claims, 1 Drawing Figure

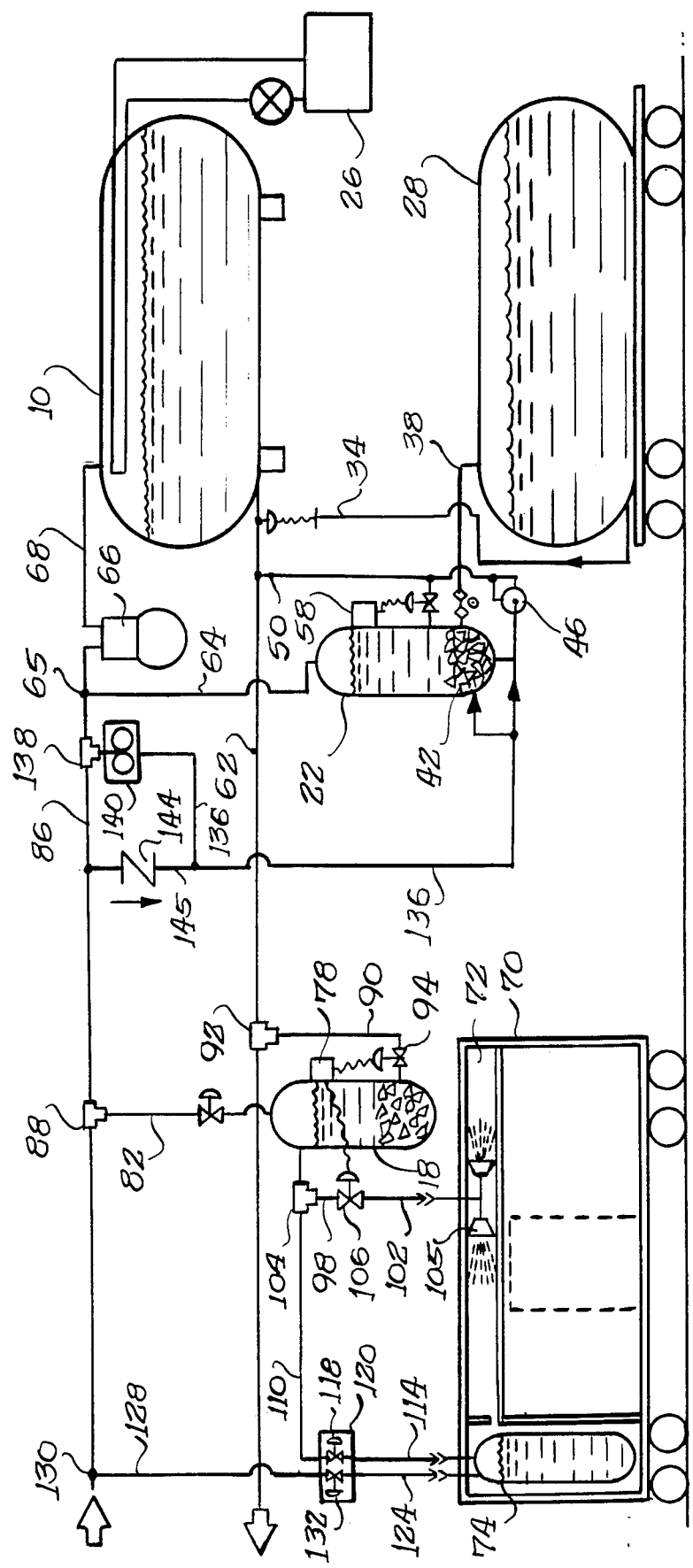

PRODUCTION OF LARGE QUANTITIES OF CO$_2$ SNOW

This invention relates generally to cryogenically cooled transportable refrigeration systems. More particularly this invention relates to a method and system for efficiently providing large quantities of CO$_2$ snow.

The supply and replenishment of CO$_2$ and CO$_2$ snow in connection with the transport of frozen commodities, such as by rail or truck, heretofore has not been efficient in various respects. Delivery of liquid CO$_2$ by rail or truck has been incomplete or has resulted in waste arising from removing the liquid CO$_2$ with resulting creation of residual CO$_2$ vapor in the delivery rail tank car or tank truck. The residual vaporized CO$_2$ in the tank car or truck never reaches the storage tank at the delivery point with resulting waste in extra net transportation costs to the supplier of CO$_2$.

The creation of CO$_2$ snow for refrigeration systems such as a rail car refrigeration system also has not been efficient. A snow bunker in a rail car's ceiling generally provides the predicted refrigeration needs for refrigeration of frozen commodities en route. An optional on-board liquid CO$_2$ system provides for unpredicted needs. To fill the snow bunker with CO$_2$ snow, such refrigerated rail cars need substantial amounts of CO$_2$, on the order of 20,000 pounds. Product loading efficiency demands that the CO$_2$ snow be supplied at very fast rates; accordingly, liquid CO$_2$ must be delivered at very fast rates to expand through an expansion device, such as a snow horn or spray header, to create such solid CO$_2$ snow. Generally the colder the liquid CO$_2$, the more efficient is the production of snow. Liquid CO$_2$ is normally stored in large vessels of CO$_2$ under high pressure on the order of 300 psig and 0° F. Providing a multiplicity of large subcooled CO$_2$ sources sufficient to provide a multiplicity of stations capable of providing snow for multiple refrigeration cars would be costly and would not be an efficient way to store large amounts of subcooled CO$_2$.

Frequently, refrigerated railroad cars optionally are equipped with a small on-board auxillary liquid CO$_2$ tank so as to provide additional CO$_2$ snow and en route cooling should the bunker in the refrigerated car become depleted of CO$_2$ snow due to unexpected delays or heat incursions. When the liquid CO$_2$ in tne tank is originally at 0° F., the inevitable warming of the tank causes the pressure to rise relatively rapidly and the pressure relief values to vent. However, if a car is loaded with −50° F. liquid CO$_2$, when the car returns after a trip, even though the pressure in the on-board liquid CO$_2$ tank has risen because of warming, venting may not as yet have occurred, thus providing an opportunity to prevent the resulting economic loss from the venting of the CO$_2$ in the on-board tank.

It is an object of this invention to provide an efficient method and system for providing large quantities of CO$_2$ snow.

It is another object of this invention to provide complete unloading of a CO$_2$ delivery vehicle to a user's storage vessel.

It is a further object of this invention to provide the generation of cold liquid CO$_2$ at a very fast rate for the efficient production of CO$_2$ snow with a resulting use of CO$_2$ in reduced amounts by effecting subcooling of the CO$_2$.

It is yet another object of the invention to provide a method and system to cool, remove and/or resubcool CO$_2$ in an on-board CO$_2$ vessel used in transport to minimize boil-off losses of liquid CO$_2$.

These and other objects of the invention should be apparent from the following detailed description for carrying out the invention when read in conjunction with the accompanying drawings wherein:

The FIGURE is a diagrammatic view showing a ground support installation in conjunction with a refrigerated railroad car which embodies various features of the invention.

Briefly it has been found that large quantities of CO$_2$ snow may be provided by maintaining a reservoir of at least about 4500 pounds of CO$_2$ at about the triple point of the CO$_2$, a substantial portion of which is solid CO$_2$. A source of high pressure CO$_2$, such as the liquid portion of a large storage tank at about 300 psig at about 0° F., is connected to one region of the reservoir. A second region in the reservoir is connectable to a receptacle such as a snow bunker in a refrigerated railroad car. The solid CO$_2$ in the reservoir contacts and rapidly subcools, from about 0° F. to at least about −40° F., and usually to about −60° F., liquid CO$_2$ flowing at high pressure from the storage tank through the reservoir, so that the reservoir then supplies a flow of high pressure, cold CO$_2$ for expansion at the snow bunker to efficiently create CO$_2$ snow. The refrigerated railroad car may be equipped with an ancillary insulated tank for liquid CO$_2$. The ancillary tank also is interconnected with the reservoir such that the reservoir may simultaneously supply cold liquid CO$_2$, i.e. at about −60° F., to the ancillary insulated tank while the snow bunker is being filled. Hence, the first reservoir provides a source of cold liquid CO$_2$ for the ancillary tank, which tank as a result of being filled with such cold liquid CO$_2$, will remain below maximum pressure for longer periods of time and minimize venting losses.

It has been found that a second reservoir of CO$_2$ at its triple point may be used in the invention in conjunction with a group of these first reservoirs and the storage tank, which second reservoir is also particularly useful when receiving CO$_2$ from a CO$_2$ supply vehicle. The second reservoir should also contain CO$_2$ at about the triple point, i.e., about 60 psig and at about −70° F. The second reservoir may be connected to the supply vehicle after it has completed delivery of its load of liquid CO$_2$ under high pressure, such as at about 300 psig at 0° F., to cause any residual liquid CO$_2$ in the supply vehicle to vaporize and a large portion of the residual vapor in this very large tank volume to flow from the high pressure supply vehicle to the second reservoir, where it condenses upon contact with solid CO$_2$ therein causing some melting and providing additional liquid CO$_2$. This provides for more complete vapor-residence pull down from the supply vehicle to effect complete delivery to the high pressure storage tank. The second reservoir is connected to the storage vessel and to the series of first reservoirs to permit delivery of condensed liquid and CO$_2$ vapor, as by pumping, from the second reservoir to either the storage tank or to the first reservoir thereby ultimately effecting an efficient delivery of CO$_2$ from the supply vehicle to the storage vessel or to the first reservoir.

The second reservoir also is connected with the first reservoir and connectable to the ancillary tank in a rail car to permit pressurized vapor from the ancillary tank and first reservoir to flow into a lower region of the second reservoir to contact solid $CO_2$ therein and condense. This permits the condensation of $CO_2$ vapor from the ancillary tank which may have had heat incursions to minimize boil off losses and venting, to provide a means for drawing down pressure in the ancillary tank so as to cool liquid $CO_2$ remaining there without putting large loads on condensers or Freon refrigeration units associated with the storage tank, as well as to provide further means for condensing vapor from the first reservoir.

The first reservoir and duplicates of it serve as multiple stations for providing sources for high pressure subcooled liquid $CO_2$ for the simultaneous expansion and production of $CO_2$ snow for a multiplicity of refrigerated railroad cars or the like without requiring a multiplicity of large heavily insulated storage tanks which large tanks would otherwise be required to be cooled as sources of subcooled high pressure $CO_2$. The second reservoir and duplicates of it not only provide a means for effective and complete unloading of a $CO_2$ delivery vehicle, but also provide a means for condensing $CO_2$ vapor from auxillary on-board tanks or vessels on railroad cars or the like being unloaded and refilled. This is especially significant where a multiplicity of railroad cars have one or more auxillary tanks which contain $CO_2$ liquid and/or vapor which should be recovered but which would otherwise cause heavy loading on one or more condensors and/or compressors that condense the $CO_2$ vapor are associated with the main storage tank and condense the $CO_2$ vapor therefrom.

Depicted in the FIGURE is a system to practice the method of invention to provide large quantities of high pressure subcooled $CO_2$ for the production of snow, to simultaneously supply and off-load $CO_2$ to and from mobile ancillary $CO_2$ tanks, as well as to efficiently supply an on-site storage vessel from a supply vehicle. The system includes an insulated storage tank or vessel 10 adjacent a railroad siding having a volume in the range of about 1000 to about 2000 cubic feet filled with liquid $CO_2$ at about 300 psig and about 0° F., a first reservoir 18 and a second reservoir 22, both reservoirs having a size in the range of about 75 to about 100 cubic feet and each containing at least about 4,500 pounds of $CO_2$ at its triple point. The storage tank has a standard commercial refrigeration system 26, such as a Freon system, to reject heat gained by tank 10 from the atmosphere. The refrigeration system has the additional duty of providing additional refrigeration upon demand to create the initial and resupply of slush or solid $CO_2$ to the first and second reservoirs. Hence the refrigeration system is oversized and has a capacity in the range of about 50,000 to about 150,000 BTU/hour, depending upon the number of stations and their frequency of use. A supply source 28 for liquid $CO_2$, such as a highway trailer or tank car, is connected to the insulated storage tank 10 by line 34 for the direct transfer of liquid $CO_2$ from the supply source to the storage tank by pressure or pump (not shown) to a lower portion of such $CO_2$ storage tank.

Supply source 28 also is connected to second reservoir 22 by line 38 through valve 40 for the removal of $CO_2$ vapor and residual liquid from the supply source. After the transfer of substantially all of the liquid $CO_2$ from the supply source 28 through line 34 to the storage tank 10 is completed, rapid withdrawal of $CO_2$ vapor from the supply source through line 38 is provided. Following removal of $CO_2$ liquid from the supply source to the storage tank down to a pressure of about 250 to about 200 psig or lower depending upon the temperature characteristics of the material of the supply source, the remaining liquid and vapor in the supply source will still have a pressure well above the pressure of 60 psig in the second reservoir. Thus the connection of the supply source with the second reservoir will cause a rapid transfer of $CO_2$ vapor from the supply source through line 38 to the bottom of the second reservoir which contains $CO_2$ slush. The $CO_2$ vapor flowing through line 38 from the supply source 28 condenses in the second reservoir upon contact with the solid $CO_2$ causing its melting. Line and 50 connects the lower region of the second reservoir with the lower portion of storage tank 10 through pump 46. As the condensation of $CO_2$ vapor in the second reservoir increases its total liquid $CO_2$ content, pump 46 will operate at the discretion of control panel 58 to remove surplus liquid $CO_2$ as it is formed in the second reservoir by pumping it to the storage tank or to the first reservoir 18 through lines 62, 50. The upper region of the second reservoir also is connected to the upper region of the storage tank through a vapor line 64, a tee 65 to a compressor 66 which compresses the $CO_2$ vapor and returns it to the storage tank 10 through line 68. This permits vapor to be removed from the second reservoir and returned to the storage tank.

The first reservoir 18 is utilized in providing high pressure cold liquid $CO_2$ to a refrigerated mobile car 70, such as a frozen food railroad car, the upper region of which has a $CO_2$ snow bunker 72 and an on-board insulated auxiliary tank 74. Typically, the snow bunker when full will contain at least about 9,500 pounds of $CO_2$ snow, and the auxillary tank will contain about 3000 to about 6000 pounds of liquid $CO_2$ at a pressure of from about 75 to about 125 psig. Additional stations with additional reservoirs 18 for servicing additional cars are not shown, but may be provided. Line 62 not only connects the storage tank 10 with the first reservoir 18, but it may go to other duplicates of reservoir 18 to provide additional multiple loading stations for additional railroad cars.

The operation of the first reservoir 18 is controlled by first reservoir control panel 78. When not operably connected to the storage tank 10, the first reservoir is preferably filled with $CO_2$ at or near its triple point, about $-70°$ F. and about 60 psig, which pressure and temperature the control panel maintains by means such as weight and pressure sensors and a logic analyser, as is generally known in control technology.

The first reservoir 18 is connected to the storage tank 10 by vapor lines 82 and 86 through tee 88 and line 68 to compressor 66, which compresses vapor for its return to storage tank 10. The first reservoir 18 is connected to the liquid $CO_2$ portion of storage tank 10 through line 90 which is connected to line 62 through tee 92, line 62 connecting to the lower portion of the storage tank. Valve 94, which is controlled by control panel 78, regulates the flow of high pressure liquid $CO_2$ into the first reservoir. The pressure of first reservoir is raised to about the pressure of the storage tank when the first reservoir is operably connected to the higher pressure storage tank, the first reservoir then acting as a source of high pressure liquid $CO_2$ (which is subcooled because of the presence of the solid $CO_2$, the cold liquid $CO_2$ passing through the first reservoir prior to its expansion to make $CO_2$ snow.

The first reservoir is connected to the snow bunker 72 of railroad car 70 through lines 98 and 102 and through tee 104, line 102 being connected to a snow horn 105 in the railroad car which permits the expansion of the liquid $CO_2$ and creates $CO_2$ snow. Valve 106 controlled by control panel 78 controls the flow of liquid $CO_2$ through line 102 and the snow horn 105.

Line 98 connects through tee 104 with lines 110 and 114, thereby connecting the first reservoir 18 with auxillary tank 74 through valve 118 to provide the auxillary tank with a source of cold liquid $CO_2$. The auxillary tank 74 is connected via vapor lines 124 and 128 through tee 130 with line 86 which leads to the storage tank 10 via tee 65, compressor 66 and line 68. Valve 132 regulates the flow of $CO_2$ vapor from the auxillary tank to lines 128 and 86 and thence to the storage tank. The flow of $CO_2$ to and from the auxillary tank is controlled by control panel 120 through valves 132 and 118.

Vapor line 136 interconnects vapor line 86 with second reservoir 22 through tee 138. A blower 140 is provided in line 136; however, a check valve 144 is provided in a branch line 145 in parallel with the blower 140 to allow the flow of $CO_2$ vapor from line 128 to the second reservoir 22 at a faster rate than the blower provides should the pressure differential be sufficient. This removes a potential load of $CO_2$ vapor from compressor 64 when vapor is being received from multiple auxillary tanks when multiple cars are being off-loaded. $CO_2$ vapor flowing through line 136 to the second reservoir is condensed upon contract with solid $CO_2$. Valve 144 closes line 136 to the compressor so that the compressor always takes suction through the line 64.

The supply of liquid $CO_2$ and $CO_2$ snow to the refrigerated car 70 is provided by opening valve 94 via control panel 78 which raises the pressure in the first reservoir to about the pressure in the storage tank and allows liquid $CO_2$ to flow through lines 62 and 90 directly to the bottom of the first reservoir which contains solid or slush $CO_2$. The first reservoir cools the liquid $CO_2$ from about 0° F. to at least about $-40°$ F. and preferably to about $-70°$ F., which cold liquid $CO_2$ then flows through and out of the upper region of the first reservoir at a high pressure of about 300 psig, which corresponds to the pressure in the storage tank through line 98, and travels through open valve 106 and line 102 to the snow horn 105 in the snow bunker of the refrigerated car. A screen or other suitable means (not shown) is provided in the first reservoir so that the solid or slush portion of the $CO_2$ in the reservoir remains there, but the liquid $CO_2$ flowing therethrough will subcool nearly to the slush temperature, i.e. about $-70°$ F. The liquid $CO_2$ under high pressure is expanded by the snow horn and snow is made. When the subcooled liquid $CO_2$ reaches the snow bunker and snow horn, a larger percentage of the $CO_2$ turns into snow, relative to liquid $CO_2$ which is not subcooled. Thus a considerable savings in liquid $CO_2$ is effected without any heat exchange surface to limit the rate of cooling action on the liquid $CO_2$. Moreover the rate of snow-making is increased, with the filling of a bunker with 9500 pounds of snow being achieved in about 20 minutes.

The first reservoir also is utilized in providing subcooled liquid $CO_2$ to auxillary tank 74, at temperatures of at least about $-40°$ F. and preferably about $-70°$ F. so that little or no $CO_2$ is lost over extended periods of time through warming and venting. Valve 118 is opened at control panel 120 to permit subcooled liquid $CO_2$ to flow through lines 98, 110 and 114 to auxillary tank 74. This may be done either with or without simultaneously flowing liquid $CO_2$ through lines 98 and 106 to the snow horn. The control panel 120 also opens valve 132 which permits vapor to be removed through lines 124, 128 and 86 and routed back to the storage tank 10 either through compressor 66 or through the second reservoir through line 136.

It should be understood that while certain preferred embodiments of the present invention have been illustrated and described, various modifications thereof will become apparent to those skilled in the art, and accordingly, the scope of the present invention should be defined only by the appended claims and equivalent thereof.

What is claimed is:

1. A method for efficiently providing large quantities of $CO_2$ snow, which method comprises the steps of maintaining a reservoir of at least about 2000 pounds of solid $CO_2$ at about its triple point containing a substantial portion of solid $CO_2$, connecting a source of high pressure liquid $CO_2$ to a first region of said reservoir, connecting a second region of said reservoir to a receptacle for receiving a large quantity of $CO_2$ snow and causing the flow of high pressure liquid $CO_2$ through said reservoir while deterring the exit passage of solid $CO_2$, whereby high pressure $CO_2$ flows through said reservoir when it is subcooled by contact with solid $CO_2$ therein, and expanding said subcooled $CO_2$ at the receptacle to create solid $CO_2$ and $CO_2$ vapor.

2. A method in accordance with claim 1 wherein subcooled liquid $CO_2$ is supplied to an ancillary insulated tank that is interconnected with the receptacle simultaneously with supply of $CO_2$ snow to the receptacle.

3. A method in accordance with claim 2 wherein said high pressure liquid $CO_2$ is supplied from an insulated storage vessel and $CO_2$ vapor from an upper region of said reservoir is compressed and returned to said storage vessel.

4. A method in accordance with claim 3 wherein a second reservoir of $CO_2$ is created at about the triple point, wherein vapor from said second reservoir is also compressed and delivered to the storage vessel and wherein said second reservoir is connected to a high pressure tank of a supply vehicle whereby $CO_2$ vapor is rapidly withdrawn from the supply vehicle tank following delivery of its load of high pressure liquid $CO_2$ to the insulated storage vessel.

5. A method in accordance with claim 4 wherein liquid $CO_2$ is pumped from said second reservoir to the insulated storage tank.

6. A method in accordance with claim 5 wherein $CO_2$ vapor from said first reservoir and from the ancillary tank is normally pressurized and caused to flow into a lower region of said second reservoir where it is condensed by melting solid $CO_2$ therewithin.

7. A method in accordance with claim 4 wherein said subcooled high pressure liquid $CO_2$ is sprayed into an upper receptacle within a refrigerated railway boxcar.

8. A method in accordance with claim 1 wherein said source of high pressure liquid $CO_2$ is connected to a lower region of said reservoir and said outlet from said vessel is from an upper region of said reservoir whereby high pressure $CO_2$ flows upward through said reservoir.

9. A method in accordance with claim 1 wherein liquid $CO_2$ is subcooled to at least about $-40°$ F. prior to leaving said reservoir.

10. A method in accordance with claim 9 wherein said reservoir of $CO_2$ is created to contain at least 4,000 pounds of solid $CO_2$ at about the triple point and wherein said subcooled high pressure liquid $CO_2$ is sprayed into an upper receptacle within a refrigerated railway boxcar where it expands to create at least about 15,000 pounds of $CO_2$ snow within a time period of no more than about 20 minutes.

11. A system for efficiently providing large quantities of $CO_2$ snow, which system comprises an insulated vessel for storing at least about 2000 pounds of solid $CO_2$ at about the triple point thereof and having an inlet and an outlet,
  means for maintaining a reservoir of $CO_2$ at about its triple point containing a substantial portion of solid $CO_2$,
  first conduit means for connecting a source of liquid $CO_2$ to said vessel inlet,
  second conduit means extending from said outlet from said vessel and
  means for allowing the flow of liquid $CO_2$ outward through said outlet while deterring the passage of solid $CO_2$,
  said second conduit means being designed for coupling to a receptacle for receiving a large quantity of $CO_2$ snow, whereby high pressure liquid $CO_2$ can be caused to flow from said source, through said vessel where it is subcooled by contact with solid $CO_2$ therein, and thence outward through said second conduit means to a receptacle where it can be expanded to solid $CO_2$ and $CO_2$ vapor.

12. A system in accordance with claim 11 wherein third conduit means connected to said second conduit means allows subcooled liquid $CO_2$ to be supplied to an insulated tank simultaneously with supply of $CO_2$ snow to a receptacle.

13. A system in accordance with claim 12 wherein an insulated storage vessel is connected to said first conduit means, a vapor line extends from an upper portion of said storage vessel, compressor means in said vapor line, said vapor line being connected to an upper region of said insulated vessel, and means for connecting said vapor line to an upper region of the insulated tank.

14. A system in accordance with claim 13 wherein a second insulated vessel is provided having connections to said vapor line and to said first conduit means and being also adapted for holding a reservoir of $CO_2$ at about the triple point and wherein means are provided for connecting said second vessel to high pressure tank means carried by a supply vehicle whereby $CO_2$ vapor can be rapidly withdrawn from the supply vehicle tank following delivery of its load of high pressure liquid $CO_2$ to said insulated storage vessel.

15. A system in accordance with claim 14 wherein means is provided for pumping liquid $CO_2$ from said second insulated vessel to said insulated storage vessel.

16. A system in accordance with claim 15 wherein pressure-operated valve means is provided in said vapor line on the suction side of said compressor which is normally in the closed position and means is provided for causing vapor in said vapor line to normally flow into a lower portion of said second insulated vessel where it is condensed by melting solid $CO_2$ therewithin.

17. A system in accordance with claim 14 wherein said insulated storage vessel is located generally adjacent a railroad siding and said second conduit means is adapted to connect to an inlet to a spray header disposed in a compartment within a refrigerated railway boxcar.

18. A system in accordance with claim 11 wherein said inlet leads to a lower region of said vessel, and
  said outlet leads from an upper region of said vessel so that the flow of liquid $CO_2$ is upward through said vessel.

* * * * *